(12) United States Patent
Mallary et al.

(10) Patent No.: US 7,372,664 B1
(45) Date of Patent: May 13, 2008

(54) TECHNIQUES TO REDUCE ADJACENT TRACK ERASURE INCLUDING A WRITE POLE WITH A TIP HAVING FACES AT ANGLES

(75) Inventors: Michael Mallary, Sterling, MA (US); Mourad Benakli, Shrewsbury, MA (US)

(73) Assignee: Maxtor Corporation, Longmont, CO (US)

( * ) Notice: Subject to any disclaimer, the term of this patent is extended or adjusted under 35 U.S.C. 154(b) by 336 days.

(21) Appl. No.: 11/005,885

(22) Filed: Dec. 6, 2004

Related U.S. Application Data (60) Provisional application No. 60/526,938, filed on Dec. 4, 2003.

(51) Int. Cl.
 *G11B 5/147* (2006.01)
(52) U.S. Cl. ...................................... 360/126
(58) Field of Classification Search ................. 360/126
 See application file for complete search history.

(56) References Cited

U.S. PATENT DOCUMENTS

| | | | |
|---|---|---|---|
| RE33,949 E | 6/1992 | Mallary et al. | |
| 5,240,740 A | 8/1993 | Frey et al. | 427/130 |
| 5,267,112 A | 11/1993 | Batra et al. | 360/119 |
| 5,333,086 A | 7/1994 | Frey et al. | 360/126 |
| 5,801,910 A | 9/1998 | Mallary | 360/126 |
| 6,525,904 B1 * | 2/2003 | Sasaki | 360/126 |
| 6,710,972 B1 | 3/2004 | Mochizuki et al. | 360/123 |
| 7,133,253 B1 * | 11/2006 | Seagle et al. | 360/126 |
| 2002/0105756 A1 * | 8/2002 | Sasaki | 360/126 |

* cited by examiner

*Primary Examiner*—A. J. Heinz
(74) *Attorney, Agent, or Firm*—Foley & Lardner LLP (57) ABSTRACT

Techniques for reducing adjacent track erasure include: a bucking coil having a lower number of turns than the write coil for bucking out a portion of the field induced by the write coil; a hybrid solenoid coil that includes turns that are in a pancake arrangement and turns that are in a solenoid arrangement; a P2 write pole tip with an increasing amount of flare as the distance from the ABS increases; a notch along an edge of the ABS surface of the P1 write pole adjacent to a tooth that extends closest to the P2 write pole; a back notch adjacent to the tooth on the P1 write pole that has a width generally corresponding to the width of the tooth; and a layered structure on the pole tip of the P1 write pole adjacent to the tooth, the layers having at least one of decreasing amounts of saturation magnetization, decreasing amounts of permeability, or alternating layers of magnetic and nonmagnetic material, where the width of the magnetic and nonmagnetic layers in controlled or the characteristics of the magnetic layers are controlled with regard to saturation magnetization or magnetic permeability to effectively decrease the overall saturation magnetization or permeability.

25 Claims, 7 Drawing Sheets

TECHNIQUES TO REDUCE ADJACENT TRACK ERASURE INCLUDING A WRITE POLE WITH A TIP HAVING FACES AT ANGLES

CROSS-REFERENCE TO RELATED APPLICATIONS

This application claims priority from U.S. Provisional Patent Application No. 60/526,938, filed Dec. 4, 2003, entitled "Techniques to Reduce Adjacent Track Erasure", the contents of which are incorporated herein by reference.

FIELD OF THE INVENTION

This application relates to techniques and arrangements for write heads in data storage applications, particularly techniques relating to minimizing adjacent track erasure.

BACKGROUND OF THE INVENTION

In hard disk drives, data is written to and read from magnetic recording media, herein called disks. Typically, one or more disks having a thin film of magnetic material coated thereon are rotatably mounted on a spindle. A read/write head mounted on an actuator arm is positioned in close proximity to the disk surface to write data to and read data from the disk surface.

During operation of the disk drive, the actuator arm moves the read/write head to the desired radial position on the surface of the rotating disk where the read/write head electromagnetically writes data to the disk and senses magnetic field signal changes to read data from the disk. Usually, the read/write head is integrally mounted in a carrier or support referred to as a slider. The slider generally serves to mechanically support the read/write head and any electrical connections between the read/write head and the disk drive. The slider is aerodynamically shaped, which allows it to fly over and maintain a uniform distance from the surface of the rotating disk.

Typically, the read/write head includes a magnetoresistive read element to read recorded data from the disk and an inductive write element to write the data to the disk. The read element includes a thin layer of a magnetoresistive sensor stripe sandwiched between two magnetic shields that may be electrically connected together but are otherwise isolated. A current is passed through the sensor stripe, and the resistance of the magnetoresistive stripe varies in response to a previously recorded magnetic pattern on the disk. In this way, a corresponding varying voltage is detected across the sensor stripe. The magnetic shields help the sensor stripe to focus on a narrow region of the magnetic medium, hence improving the spatial resolution of the read head.

The write element typically includes a coil of wire through which current is passed to create a magnetic field that can be directed toward an adjacent portion of the disk by a ferromagnetic member known as a write pole. While it is known that the write element can be arranged to either store data longitudinally or perpendicularly on the disk, most, if not all, commercial disk drives to date have utilized longitudinal recording arrangements. Although perpendicular recording techniques have the potential to allow for higher densities of recorded information, longitudinal recording is used in all current products for historical reasons. An early perpendicular recording technique is disclosed in U.S. Pat. No. RE 33,949, the contents of which are incorporated herein by reference.

In longitudinal recording, fringe fields can be produced that can inadvertently write or erase data on adjacent parallel tracks on the disk. In order to not write or erase data in adjacent tracks, the fringing field in the media in the adjacent track should be less than the nucleation field. Furthermore, in order to have a good write process, the write field in the media in the desired track for writing data should be at least twice the coercivity of the media.

Typically, the write coil is overdriven with current in order to quickly change th magnetic data in the media. For example, the profile of a current signal to the write coil may include a brief pulse of 100 milliamps and settling down to a signal of 30 milliamps. Unfortunately, overdriving the write coil in this manner ends up overdriving the fringe field as well. Of course, this can end up causing fringe or adjacent track erasure (ATE). It may be that only a few bits on an adjacent track are erased on each pass, but after writing to a particular track 100 times or more, then the adjacent track ends up corrupted. It should be understood that there are some applications where a particular track could be written to millions of times.

Previous approaches to reduce ATE have related primarily to moving sharp edges on the larger write pole further from the gap between the write poles. As is well known, the two write poles (commonly referred to as P1 and P2) are typically of different width with P2 being on the order of magnitude of the track to be written and the majority of P1 being significantly wider. The corners of P1 closest to P2 have been found to be the most problematic in creating fringing fields, since sharp edges typically cause fields to concentrate there. As shown in U.S. Pat. No. 5,267,112, these front corners of P1 can be beveled off. In this manner there are still corners, but they are further from the gap so there is less ATE. It should be noted that because of the non-linear magnetic characteristics of the recording media, reducing the fringing fields by as little as 10% can significantly reduce ATE.

Another technique for reducing ATE is now a part of the typical process of manufacturing GMR read/write heads. This technique includes using the P2 write pole as a mask on P1 and ion milling away the upper surface of P1. This ion milling process moves the corners further from the gap between P1 and P2. The ion milling that creates this deep cut does, however, have the disadvantages of cutting away the top and sides of P2 and consequently reducing track width control, creating a flux bottleneck in P2, and requires a lengthy ion milling process which results in undesirably long process times.

In addition, increasing the depth of the ion milling on P1 has diminishing returns on ATE. This is because the fringing fields come not only from the portions of P1 that are closest to P2 yet not in the gap. In addition, fringing fields come from other sources, such as the write coil, other portions of P2, and so forth.

It has also been discovered that the relationship between the magnetic field and magnetization of the media changes with temperature, so that what might be an acceptable amount of fringing field at room temperature becomes a problematic amount of fringing field at elevated temperatures.

It is desirable to design/provide a read/write head which does not suffer from the above drawbacks. It is against this background and a desire to improve on the prior art that the present invention has been developed.

SUMMARY OF THE INVENTION

In view of the foregoing, a broad objective of the present invention is to reduce adjacent track erasure in disk drive systems.

In carrying out this and other objectives, features, and advantages of the present invention, a read/write head for a disk drive is provided. The head includes a read transducer and a write transducer that is configured for longitudinal magnetic recording. The write transducer includes a pair of write poles, a write coil disposed between the pair of write poles, the write coil having n turns, and a bucking coil disposed on an opposite side of the write poles from the read transducer, the bucking coil having m turns, the write coil inducing a magnetic field that opposes a magnetic field induced by the write coil, wherein n is greater than m.

It may be that n is at least two turns greater than m, that n is at least three turns greater than m, or that n is greater than or equal to 5 and m is less than or equal to 2. The write coil and bucking coil may be electrically connected together in series so that the identical current flows in each.

In another aspect of the present invention, a read/write head for a disk drive system is provided. The head includes a read transducer and a write transducer. The write transducer includes a pair of write poles, there being two and only two write poles, a write coil disposed between the pair of write poles, the write coil having n turns, and a bucking coil disposed on an opposite side of the write poles from the read transducer, the bucking coil having m turns, the write coil inducing a magnetic field that opposes a magnetic field induced by the write coil, wherein n is greater than m.

In another aspect of the present invention, a read/write head for a disk drive system is provided. The head includes a read transducer and a write transducer. The write transducer includes a pair of write poles and a write coil having portions of turns disposed between the pair of write poles, a portion of the turns of the write coil being configured in a pancake arrangement and a portion of the turns of the write coil being configured in a solenoidal arrangement.

The turns of the pancake portion may generally lie in a single plane. The turns of the solenoid portion may generally have the same diameter. A portion of each turn may be disposed between the write poles. The head may have an air-bearing surface (ABS) facing toward an adjacent magnetic storage disk in the disk drive system, wherein the write transducer further includes a write yoke that magnetically connects the pair of write poles, wherein the turns that are configured in a pancake arrangement and that have portions of the turns that are disposed between the pair of write poles have these portions located further from the ABS than the portions disposed between the write poles of the turns that are configured in a solenoid arrangement.

In another aspect of the present invention, a read/write head for a disk drive system is provided, wherein the read/write head has an air-bearing surface (ABS) facing toward an adjacent magnetic storage disk in the disk drive system. The head includes a read transducer and a write transducer having a first write pole (P1) and a second write pole (P2). The second write pole has a pole tip with an ABS side, a side facing toward the first write pole, a side facing in an opposite direction from the first write pole, and a pair of lateral sides disposed between the sides facing toward and in an opposite direction from the first write pole, wherein the pair of lateral sides each have a plurality of corresponding faces, including a first face nearest the ABS on each lateral side, with the pair of corresponding first faces being generally parallel to each other, the lateral sides each having a second face adjacent to the first face, each of the second faces varying from a parallel position with the first face of the same lateral side by more than 5 degrees and less than the 15 degrees, the lateral sides each having a third face adjacent to the second face, each of the third faces varying from a parallel position with the first face of the same lateral side by more than 15 degrees and less than the 30 degrees.

Each lateral side may further include a fourth face adjacent to the third face, each of the fourth faces varying from a parallel position with the first face of the same lateral side by more than 30 degrees and less than 60 degrees. The angle between the first and second faces may be approximately 7 degrees. The angle between the first and third faces may be approximately 20 degrees. The angle between the first and fourth faces may be approximately 45 degrees.

In another aspect of the present invention, a read/write head for a disk drive system is provided, wherein the read/write head has an air-bearing surface (ABS) facing toward an adjacent magnetic storage disk in the disk drive system. The head includes a read transducer and a write transducer having a first write pole (P1) and a second write pole (P2). The first write pole has a main body with a generally planar ABS surface, the main body having a tooth extending out therefrom toward the second write pole, the tooth having a side that is along the ABS surface, the main body having a side that is normal to the ABS surface and generally faces in the direction of the second write pole, the main body having a pair of side faces disposed on opposite sides of the tooth, the faces being recessed from the write pole relative to the tooth, the main body further having an extended notch defined therein between each of the side faces and the ABS surface.

The notch between the side faces and the ABS surface may have a width dimension in a direction normal to the ABS surface and a depth dimension in a direction parallel to the ABS surface, wherein the depth is greater than the width. Each notch may extend for the entire extent of a region where each side face would otherwise intersect with the ABS surface. The main body may further include a back notch defined therein in a region between the two side faces and adjacent to the tooth. The back notch may have a length along a dimension between the two side faces that is approximately equal to the length of the tooth along the same dimension.

In another aspect of the present invention, a read/write head for a disk drive system is provided, wherein the read/write head has an air-bearing surface (ABS) facing toward an adjacent magnetic storage disk in the disk drive system. The head includes a read transducer and a write transducer including a first write pole (P1) and a second write pole (P2). Each of the first and second write poles have a face on a pole tip thereof, the faces being opposed to each other, the first write pole having a main body that, along with the opposed face, is composed of a material having a characteristic of a given level of saturation magnetization, the main body also having a region adjacent to the opposed face and that generally faces in the direction of the second write pole, the region having an uppermost layer that is composed of a material having a characteristic of a given level of saturation magnetization that is significantly less than the given level for the main body and opposed face.

The difference between the two given levels may be approximately a factor of 2. The region may include more than one layer of material stacked on top of each other, with the given level of saturation magnetization decreasing for each successive layer when proceeding in a direction from the main body to the uppermost layer. The second write pole may have a back face on an opposite side of the pole tip from the opposed face, the back face having an uppermost layer that is composed of the same material as the uppermost layer of the first write pole. A remainder of the pole tip of the second write pole may be composed of the same material as the main body and opposed face of the first write pole.

In another aspect of the present invention, a read/write head for a disk drive system is provided, wherein the read/write head has an air-bearing surface (ABS) facing toward an adjacent magnetic storage disk in the disk drive system. The head includes a read transducer and a write transducer including a first write pole (P1) and a second write pole (P2). Each of the first and second write poles having a face on a pole tip thereof, the faces being opposed to each other, the first write pole having a main body that, along with the opposed face, is composed of a magnetic material, the main body also having a region adjacent to the opposed face and that generally faces in the direction of the second write pole, the region having a series of alternating layers that are composed of magnetic and non-magnetic material.

The layers of magnetic material may be composed of the same material as the main body. The alternating layers may be of uniform thickness.

In another aspect of the present invention, a read/write head for a disk drive system is provided, wherein the read/write head has an air-bearing surface (ABS) facing toward an adjacent magnetic storage disk in the disk drive system. The head includes a read transducer and a write transducer including a first write pole (P1) and a second write pole (P2). Each of the first and second write poles having a face on a pole tip thereof, the faces being opposed to each other, the first write pole having a main body that, along with the opposed face, is composed of a material having a characteristic of a given level of relative magnetic permeability, the main body also having a region adjacent to the opposed face and that generally faces in the direction of the second write pole, the region having an uppermost layer that is composed of a material having a characteristic of a given level of relative magnetic permeability that is less than 5.

The uppermost layer may have lower magnetic permeability by providing alternating layers of magnetic and non-magnetic material that are antiferromagnetically coupled together. The uppermost layer may have lower magnetic permeability by utilizing one or more layers of antiferromagnetic material.

Numerous additional features and advantages of the present invention will become apparent to those skilled in the art upon consideration of the further description that follows.

DETAILED DESCRIPTION OF THE PREFERRED EMBODIMENT

Reference will now be made to the accompanying drawings, which assist in illustrating the various pertinent features of the present invention. Although the present invention will now be described primarily in conjunction with disk drives, it should be expressly understood that the present invention may be applicable to other applications where magnetic recording of data is required/desired. In this regard, the following description of a disk drive is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain best modes known of practicing the invention and to enable others skilled in the art to utilize the invention in such, or other embodiments and with various modifications required by the particular application (s) or use(s) of the present invention.

Figure 1:
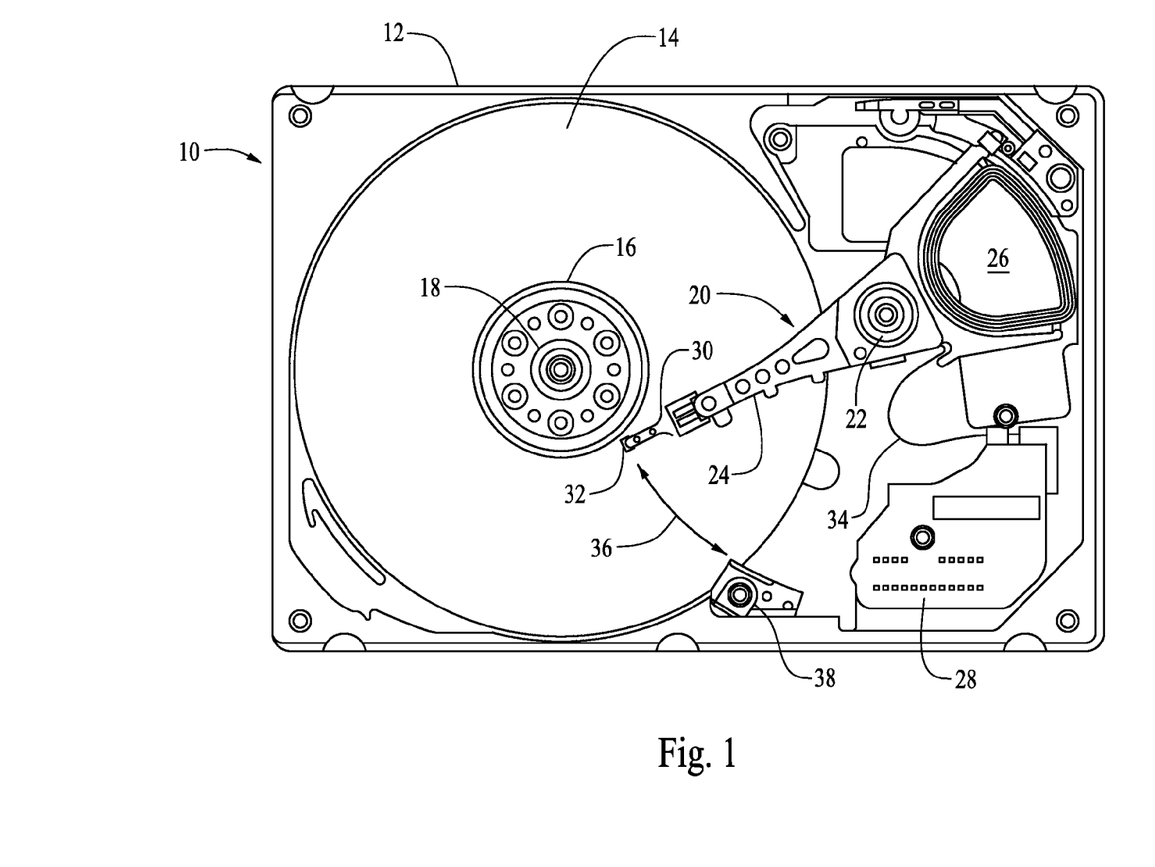
FIG. 1 is a top view of a disk drive that utilizes a head of the present invention.

FIG. 1 illustrates one embodiment of a disk drive 10. The disk drive 10 generally includes a base plate 12 and a cover (not shown) that may be disposed on the base plate 12 to define an enclosed housing or space for the various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to simultaneously spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips or the like that cantilever from a common structure. In any case, movement of the actuator arm assembly 20 is provided by an actuator arm drive assembly, such as a voice coil motor 26 or the like. The voice coil motor 26 is a magnetic assembly that controls the operation of the actuator arm assembly 20 under the direction of control electronics 28. Any appropriate actuator arm assembly drive type may be utilized by the disk drive 10, including a linear drive (for the case where the actuator arm assembly 20 is interconnected with the base plate 12 and/or cover for linear movement versus the illustrated pivoting movement about the pivot bearing 22) and other types of rotational drives.

A load beam or suspension 30 is attached to the free end of each actuator arm 24 and cantilevers therefrom. Typically, the suspension 30 is biased generally toward its corresponding disk 14 by a spring-like force. A slider 32 is disposed at or near the free end of each suspension 30. What is commonly referred to as the "head" (e.g., transducer) is appropriately mounted on the slider 32 and is used in disk drive read/write operations.

The head on the slider 32 may utilize various types of read sensor technologies such as anisotropic magnetoresistive (AMR), giant magnetoresistive (GMR), tunneling magnetoresistive (TuMR), other magnetoresistive technologies, or other suitable technologies. AMR is due to the anisotropic magnetoresistive effect with a normalized change in resistance ($\Delta R//R$) of 2-4%. GMR results from spin-dependent scattering mechanisms between two (or more) magnetic layers. The typical use in recording heads is the spin valve device that uses a pinned magnetic layer and a free layer to detect external fields. The normalized change in resistance is typically 8-12%, but can be as large as 15-20% when used with specular capping layers and spin-filter layers. TuMR is similar to GMR, but is due to spin dependent tunneling currents across an isolation layer. The typical embodiment includes a free layer and a pinned layer separated by a insulating layer of $Al_2O_3$ with the current flowing perpendicular to the film plane, producing normalized change in resistance of 12-25%. The term magnetoresistive is used in this application to refer to all these types of magnetoresistive sensors and any others in which a variation in resistance of the sensor due to the application of an external magnetic field is detected. The write transducer technology of the head of the present invention is discussed in further detail below.

The biasing forces exerted by the suspension 30 on its corresponding slider 32 thereby attempt to move the slider 32 in the direction of its corresponding disk 14. Typically, this biasing force is such that if the slider 32 were positioned over its corresponding disk 14, without the disk 14 being rotated at a sufficient velocity, the slider 32 would be in contact with the disk 14.

The head on the slider 32 is interconnected with the control electronics 28 of the disk drive 10 by a flex cable 34 that is typically mounted on the actuator arm assembly 20. Signals are exchanged between the head and its corresponding data storage disk 14 for disk drive read/write operations. In this regard, the voice coil motor 26 is utilized to pivot the actuator arm assembly 20 to simultaneously move the slider 32 along a path 36 and "across" the corresponding data storage disk 14 to position the head at the desired/required radial position on the disk 14 (i.e., at the approximate location of the correct track on the data storage disk 14) for disk drive read/write operations.

When the disk drive 10 is not in operation, the actuator arm assembly 20 is pivoted to a "parked position" to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired "parking" function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14. Terminating the rotation of the data storage disk(s) 14 in this type of disk drive configuration would then result in the slider(s) 32 actually establishing contact with or "landing" on its corresponding data storage disk 14, and the slider 32 would remain on the disk 14 until disk drive operations are re-initiated.

The slider 32 of the disk drive 10 may be configured to "fly" on an air bearing during rotation of its corresponding data storage disk(s) 14 at a sufficient velocity. The slider 32 may be disposed at a pitch angle such that its leading edge is disposed further from its corresponding data storage disk 14 than its trailing edge. The head would typically be incorporated on the slider 32 generally toward its trailing edge sine this is positioned closest to its corresponding disk 14. Other pitch angles/orientations could also be utilized for flying the slider 32.

Figure 2:
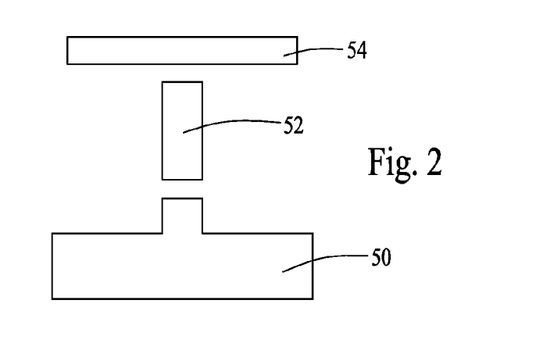
FIG. 2 is an ABS view of portions of a write head of a read/write head, showing a bucking coil.
Figure 3:
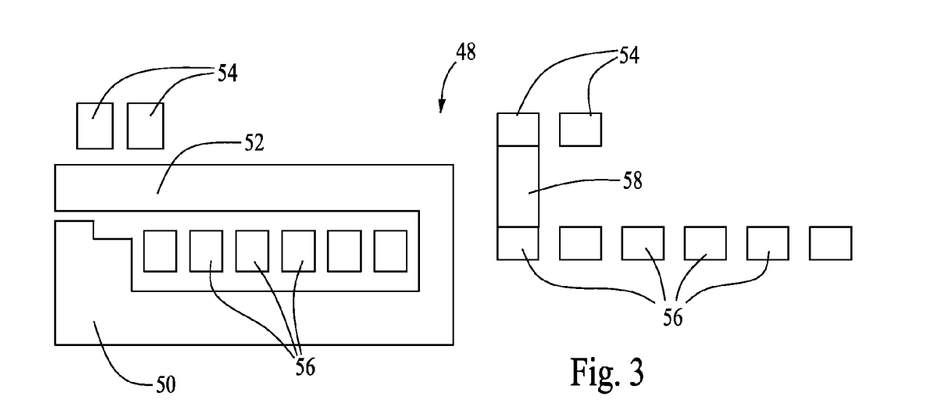
FIG. 3 is a side view of the write head of FIG. 2.

FIGS. 2 and 3 show a design for a portion of a write head 48 for a read/write head to decrease ATE. As shown in FIG. 2, the design includes a first write pole (P1) 50, a second write pole (P2) 52 and a bucking coil 54. As can be seen in FIG. 3, the read/write head 48 also includes a pancake write coil 56 with each of the turns passing between P1 50 and P2 52 and hidden from view in FIG. 2 by P1 50. As is best seen in FIG. 3, the bucking coil 54 is also in a pancake coil configuration, and has only two turns. The bucking coil 54 is driven by the same current as the write coil 56, since the coils 54 and 56 are connected together by a via 58. The bucking coil 54 produces just enough magnetic flux in an opposite direction to the flux created by the write coil 56 to block out or cancel enough fringing field to get below the above-discussed nucleation level. The invention is not limited to a bucking coil having only two turns, as other numbers of turns may be sufficient to reduce the fringing field to an acceptable level. In addition to reducing the net fringing field so as to minimize ATE, this configuration reduces the inductance of the read/write head. Unfortunately, this design is relatively complex as compared to other designs and may require many more process steps to create the head, thus resulting in increased cost. This particular write head 48 may preferably be used for longitudinal recording orientations and rather than for perpendicular recording orientations. In other words, this write head 48 might not be used with recording media that has a soft underlayer.

Figure 4:
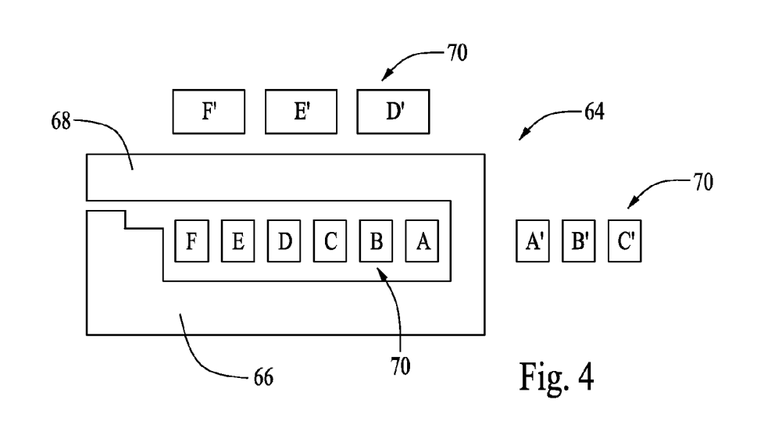
FIG. 4 is a side view of a write head of a read/write head showing a hybrid solenoid coil.

A second embodiment of a design for a portion of a write head 64 for a read/write head to decrease ATE is shown in FIG. 4. The write head 64 includes a first write pole (P1) 66 and a second write pole (P2) 68 as well as a hybrid solenoid write coil 70. It can be seen that the inner three turns of the write coil 70 (as exemplified by A, A', B, B', C, C') are in a pancake coil arrangement. By pancake coil arrangement, we mean all portions of that coil arrangement lie in or substantially in a single plane. In this case, those pancake coils referenced are formed in a radially expanding fashion, such that the diameter of the turn formed by A, A' is smaller than the diameter of the turn formed by B, B', which in turn has a smaller diameter than the turn formed by portions C, C'. The next turn of the coil (denominated as D, D') is not in a pancake arrangement, but more in a solenoid coil arrangement as are portions E, E' and F, F'. By solenoid coil arrangement, we mean portions of a coil that do not lie in a single plane, but do have diameters that are substantially the same for each of the turns.

Figure 5:
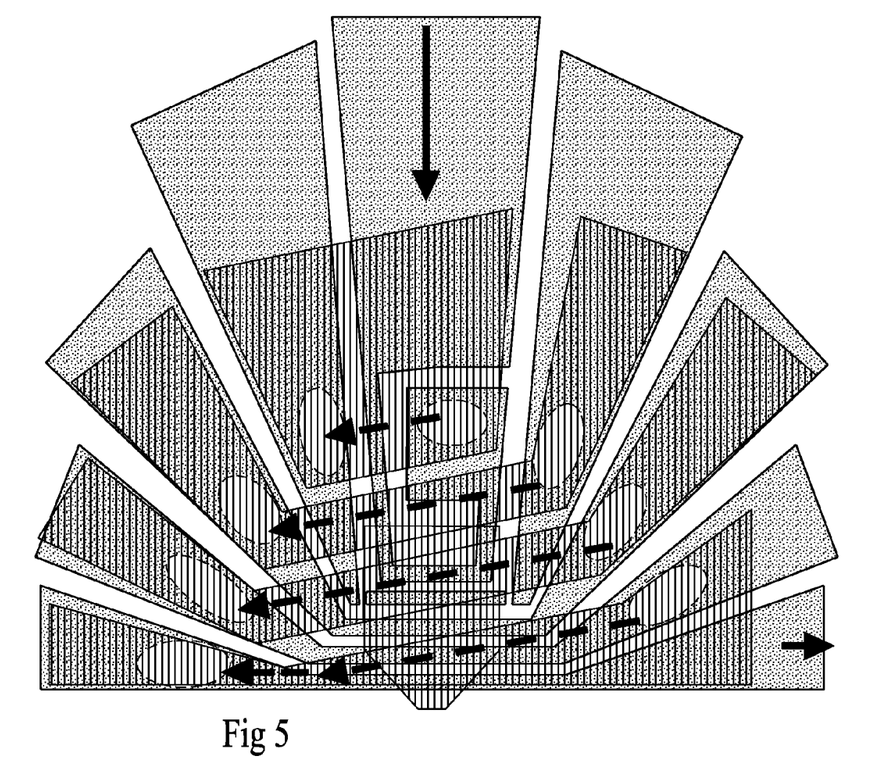
FIG. 5 is a top view of an alternative arrangement of a hybrid solenoid coil.

The coil 70 is formed in this fashion for several reasons. First of all, each of the typical coil arrangements of pancake coils or solenoid coils provide their own advantages and disadvantages. Pancake coils are easier to manufacture, but they have a relatively higher resistance and inductance than do solenoid coils, due to the increasing diameter of each successive turn. On the other hand, solenoid coils have a reduced resistance and inductance for the same reason, but they require more complex process steps in manufacture. This is because with solenoid coils it is typical to use overpass leads through vias. Producing these leads through the vias can have process issues, so it is typical in manufacturing to provide an increased amount of "real estate" in the write head to successfully accomplish these vias. Unfortunately, this increased amount of real estate can make the head larger than desired and can prevent the designer from placing each turn of the coil as close together as one might like. For these reasons, a hybrid coil is used that includes some turns that are in a pancake coil arrangement and some turns that are in a solenoid coil arrangement. This allows some of the turns (A, A', B, B', C, C') to be as close together as desired and then for the outer turns of the coil (E, E', F, F') that would normally be of much greater diameter in a pancake coil, the equal diameter turns of a solenoid coil can be used to keep the diameters smaller and thus keep the total resistance and inductance at a preferable level. This provides the added advantage that some bucking of the fringing fields is provided by turns of the write coil itself. This particular write head 64 is intended for longitudinal recording orientations and not for perpendicular recording orientations. In other words, this write head 64 would not be used with recording media that has a soft underlayer. A similar, alternative version of a hybrid solenoid coil arrangement in a write head is shown in top view in FIG. 5.

Figure 6:
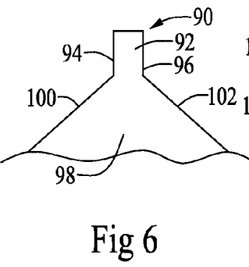
FIG. 6 is a top view of a P2 write pole tip of a read/write head.
Figures 7, 8:
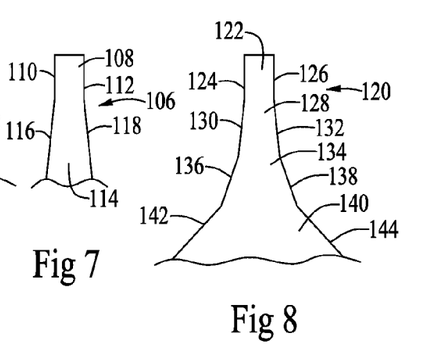
FIG. 7 is an alternative embodiment of a P2 write pole tip of a read/write head.
FIG. 8 is an alternative embodiment of a P2 write pole tip of a read/write head.

FIGS. 6, 7, and 8 show designs that are intended to reduce ATE by moving as much of the main body of the P2 write pole away from the media as is practical. FIG. 6 shows a tip 90 of a P2 write pole. The tip 90 includes a portion 92 having a pair of generally parallel side edges 94 and 96 and a portion 98 at the diverging edges 100 and 102. Edge 100 diverges from edge 94 at an angle of approximately 50 degrees, as does edge 102 from edge 96.

FIG. 7 shows another tip of a P2 write pole 106 again having a portion 108 with generally parallel side edges 110 and 112 and a portion 114 having diverging edges 116 and 118. It can be appreciated that the flare angle of edges 116 and 118 relative to parallel edges 110 and 112, respectively, may be approximately 7 degrees.

Figure 16:
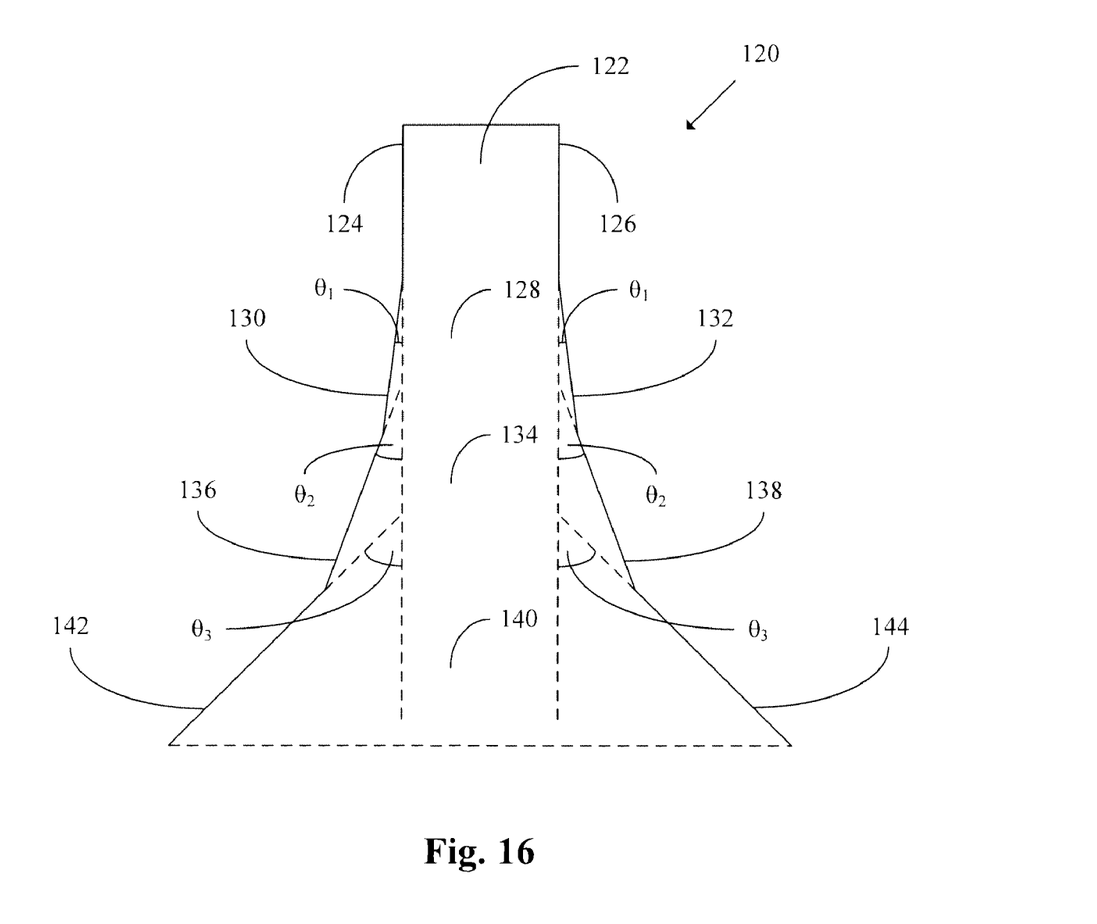
FIG. 16 illustrates the embodiment of FIG. 8 with angles shown for reference.

FIG. 8 shows another tip of a P2 write pole 120 with several sections having different flare angles. First of all, there is a section 122 having generally parallel side edges 124 and 126, another section 128 having diverging side edges 130 and 132, another portion 134 having diverging side edges 136 and 138, and another section 140 having diverging side edges 142 and 144. FIG. 16 illustrates the embodiment of FIG. 8 with angles shown for reference. With reference to FIGS. 8 and 16, it can be appreciated that, in this example, side edges 130 and 132 flare from side edges 124 and 126, respectively, at a flare angle $\theta_1$ of approximately 7 degrees. Side edges 136 and 138 diverge at an angle from side edges 124 and 126, respectively, at an angle $\theta_2$ of approximately 20 degrees. Side edges 142 and 144 diverge from side edges 124 and 126, respectively, at a flare angle $\theta_3$ of approximately 45 degrees. By having several sections with progressively greater flare angles as shown in FIG. 8, the large area portion of P2 can be moved further away from the ABS so as to reduce ATE as discussed in more detail above. As an alternative to this design, it may also be possible to provide a tip to this pole piece 120 that, rather than being segmented into various flat surfaces or facets that combine together to give a gradually increasing flare angle, includes a curved side that approximates this shape or another shape of gradually increasing flare angle. Thus, it can be seen that any geometry that achieves this goal of providing the large area of the undesired flux source further from the ABS may be desirable. These flare angles are not intended to control the saturation zone.

Figure 9:
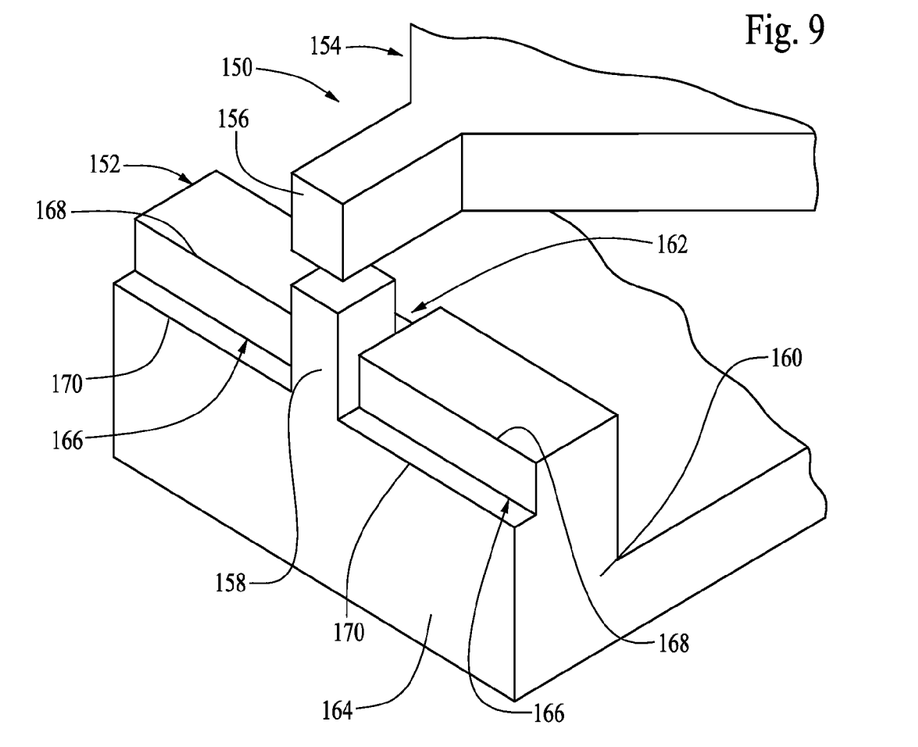
FIG. 9 is an isometric view of portions of a write head or a read/write head showing an ABS notch on either side of a tooth on a P1 write pole.

Another embodiment of a head 150 for reducing ATE is shown in FIG. 9. The head 150 includes a first write pole (P1) 152 and a second write pole (P2) 154. The P2 write pole 154 is flared and has relatively parallel side edges in the region of the pole tip 156 facing toward the ABS. The P1 write pole 152 includes a somewhat complex structure in the region of the pole tip. First of all, the pole 152 has an extended portion or tooth 158 that extends closer to the P2 write pole 154 than does any other portion of the P1 write pole 152. Such a tooth is similar to that shown in the structure of FIG. 2, described above. The P1 write pole 152 also includes a main body 160 from which the tooth 158 protrudes. A first notch, or back notch 162 is defined in the main body 160 just behind and adjacent to the tooth 158, as can be seen in FIG. 9.

The tooth 158 and main body 160 of the P1 write pole 152 include a surface 164 formed along the ABS. According to the present invention, a pair of ABS notches 166 are defined in the main body 160 along the ABS surface 164 of the P1 pole 152 and on either side of the tooth 158. The notches are formed so that the width of the notch (along an axis perpendicular to the ABS) is less than the depth of the notch (along an axis that is parallel to the ABS). For example, the width may be 0.05 μm and the depth may be 0.08 μm.

By creating the ABS notches 166 on either side of the tooth 158, a pair of corner edges 168 and 170 is created in place of a single corner edge (not shown) that would exist if the ABS notches 166 were not defined in the ABS surface 164. It can be appreciated that for the same height of the tooth 158 relative to the main body 160, the distance of the edge 170 from the write gap at the ABS is greater than the distance from the write gap at the ABS to the corner edge that would have existed if the ABS 166 notches were not defined in the ABS surface 164. Particularly, the corner edge 170 is further away. The corner edge 170 is, however, still along the ABS surface 164. Because of the relatively narrow width of the notches 166, however, the effect of this corner edge 170 is diminished as described below.

It has been discovered that the magnetic field from a particular surface such as the corner edge 170 is a function of many different variables, one of which is the distance from the edge 170 to the write gap at the ABS. The field in the media near the corner 170 is also proportional to $R^{-N}$ where R is the distance from a point in the media to the corner and N is a variable that changes based on the shape of the surface. For example, for corner edges N=⅓, for a sharp point N=½, for cylindrical surfaces N=1, and for shallow angle edges or straight lines N=0.

Thus, it can be seen that the effect of the corner edge 168 on the ATE field in the media is reduced due to its increased distance from the media. The effect of the corner edge 170 on the ATE field is decreased due to its increased distance from the gap as well as the fact that it is less of a corner edge and more like a straight line because the width of the notch has been chosen to be less than the depth, according to the present invention.

The first notch 162, which may also be known as the zero throat determining notch can extend across the entire width of the main body 160 or it can extend only in a localized region of the main body 160 adjacent to the tooth 158. For example, it can correspond in width to the tooth 158. It can be appreciated that this notch 162 can be produced by an ion milling processing step where the portion that is not to be notched is masked so as not to be milled away. It can be further appreciated that the ABS notches 166 can be milled away at the same time as the notch 162 with appropriate changes in the masking.

Figure 10:
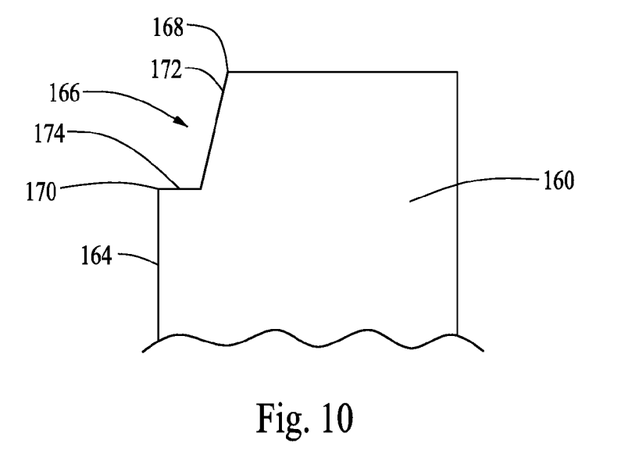
FIG. 10 is a side view of the notch of FIG. 9.

As can be seen in further detail in FIG. 10, the ABS notches 166 may not be entirely rectilinear as was shown in FIG. 9. Due to the milling process and masking, the two surfaces 172 and 174 between the corner edges 168 and 170 will likely not meet at right angles. Instead, the surface 172 will not be entirely vertical in the view of FIG. 10, but instead will be sloped due to the somewhat imperfect milling that occurs along the edge of a masked surface. This will result in the corner edge 168 being a somewhat shallower corner than a 90 degree corner, which means that the value of N in the previously described expression will be smaller and thus the magnetic field contribution from this edge will be reduced. Further, because the surface 174 will be smaller, the corner edge 170 in practical terms will not have the same effect as a typical 90 degree corner edge because of the small size of surface 174.

Figure 11:
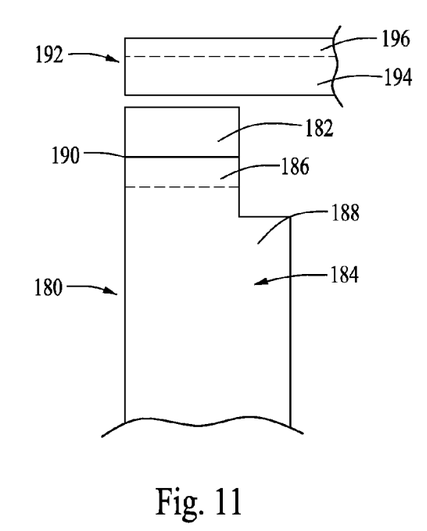
FIG. 11 is a side view of portions of a write head of a read/write head showing an uppermost layer on a face of the P1 write pole and on a face of the P2 write pole.
Figure 12:
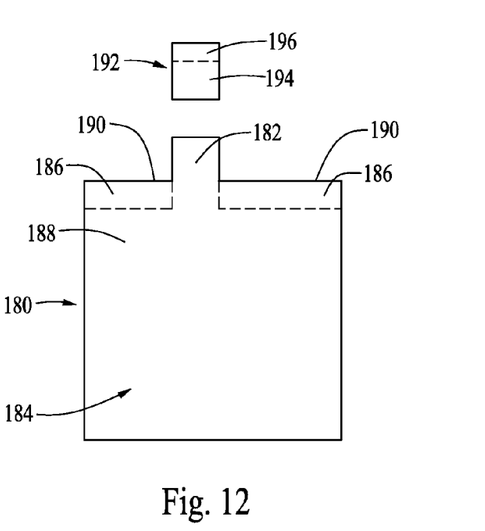
FIG. 12 is an ABS view of the portions of the write head of FIG. 11.

As can be appreciated from FIGS. 9 and 10, the creation of the ABS notches 166 on either side of the tooth 158 has the effect of softening the effects of the corner edges 168 and 170 (or can be seen as softening the corner edge that would have existed if the ABS notches 166 were not created). FIGS. 11 and 12 reveal an alternative technique for effectively softening the same corner edge. Typically, the entire body of the P2 write pole 192 and P1 write pole 180 would be composed of magnetic material (e.g. CoNiFe) that might have a saturation magnetization ($M_s$) of 2 Tesla. For this technique, imagine the arrangement shown in FIG. 9 without ABS notches 166, and with the P2 write pole 154 in place, a process that deposits a layer of magnetic material on top of the exposed main body 184 of the P1 write pole 180 to create a thin layer 186 of material (e.g. a 0.05 μm. layer of $Ni_{80}Fe_{20}$) that has a saturation magnetization of 1 Tesla. One would then obtain the structure shown in FIGS. 11 and 12. This reveals a P1 write pole 180 with a defined tooth 182 and a main body 184. A thin layer 186 of 1 Tesla material has been deposited on top of the remainder 180 of the main body which is of 2 Tesla material. The corner edge 190 that is closest to the ABS and the write gap has now been softened by the use of a magnetically softer material at the corner.

In addition, the tip of a P2 write pole 192 can be seen in FIGS. 11 and 12. The process of depositing the 1 Tesla material on top of the 2 Tesla material is represented in the P2 write pole 192 by a portion 194 of 2 Tesla material with a portion 196 of 1 Tesla material on top thereof. By coating the top surface of the P2 write pole 192, there is a category of ATE that is reduced by this addition. This category of ATE particularly occurs at higher skew angles that may be seen at the outer and inner diameters of the magnetic storage disk.

Figure 13:
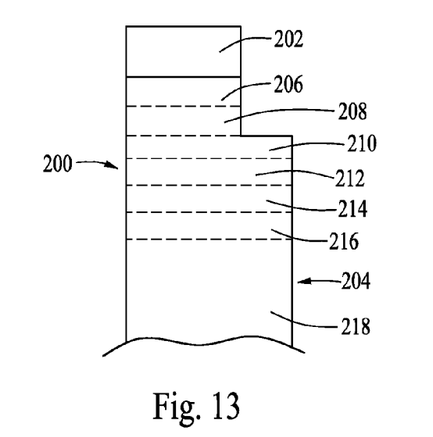
FIG. 13 is a side view of a portion of a P1 write pole of a read/write head showing a multilayered structure for controlling the effective saturation magnetization.

The same objective could be met with the design shown in FIG. 13. In this design, a P1 write pole 200 with a tooth 202 defined thereon has multiple layers of decreasing saturation magnetization is placed on top of a main body 204 thereof. This results in layers 206, 208, 210, 212, 214, and 216 being deposited on top of the remainder 218 of the main body 204. As can be appreciated, the level of saturation magnetization for each of these materials could decrease by a factor of two from each layer. For example, the remainder 218 may be 2 Tesla material, while the layer 216 may be 1 Tesla material, the layer 214 0.5 Tesla material, the layer 212 0.25 Tesla material, the layer 210 0.125 Tesla material, and so forth. Of course, any number of layers, progressing at any desired steps of saturation magnetization could be used to achieve the same objective.

Figure 14:
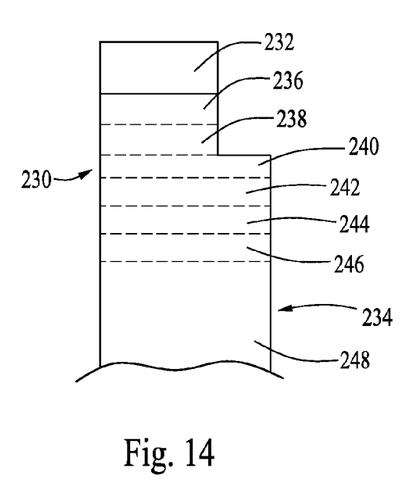
FIG. 14 is a side view of a portion of a P1 write pole of a read/write head showing a multilayered structure for controlling the effective saturation magnetization by alternating layers of magnetic and nonmagnetic material.

A similar, but different technique is illustrated in FIG. 14. In this design, instead of a stack of layers with decreasing saturation magnetization, a series of layers that alternate between magnetic material and nonmagnetic material is used. For example, a write pole 230 includes a tooth 232 and a main body 234 that includes layers 236, 238, 240, 242, 244, 246, and a remainder 248. In this example, the remainder 248 is composed of a magnetic material having a saturation magnetization of 2 Tesla. On top of this remainder 248, the layer 246 may be composed of a nonmagnetic material such as $Al_2O_3$. On top of this layer 246, a layer 244 of magnetic material is used. On top of this layer 244, a layer 242 of nonmagnetic material ($Al_2O_3$) is used. On top of this layer 242, a layer 240 of magnetic material is used. On top of this layer 240, a layer 238 of nonmagnetic material is used ($Al_2O_3$). On top of this layer 238, a layer 236 of magnetic material is used. As can be appreciated, the layers 236, 240, and 244 of magnetic material may be the same magnetic material as the remainder 248 (having a saturation magnetization of 2 Tesla) or they could be different types of magnetic material having a decreasing amount of saturation magnetization. It can also be appreciated that the relative thicknesses of each of these layers 236, 238, 240, 242, 244, and 246 could be varied to control the effective saturation of the entire region. It can be understood that these various layers may be applied by sputter deposition.

Figure 15:
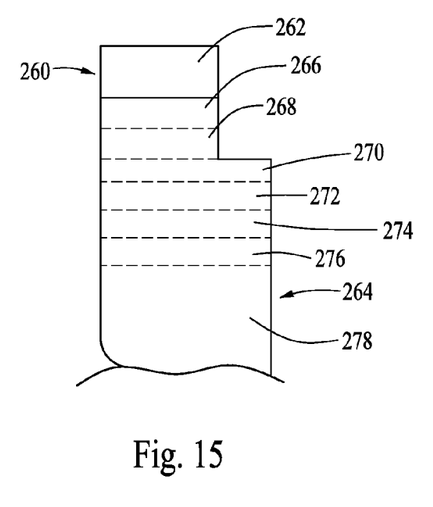
FIG. 15 is a side view of a portion of a P1 write pole of a read/write head showing a multilayered structure for controlling the effective saturation magnetization by varying the amount of magnetic permeability.

Another analogous design is illustrated in FIG. 15. FIG. 15 shows a write pole 260 having a tooth 262 and a main body 264. Layers 266, 268, 270, 272, 274, and 276 have been deposited on top of a remainder 278. In this example, rather than the saturation magnetization that is varied, the permeability of the magnetic material is varied. For this approach, low permeability magnetic material would be needed, preferably those with relative magnetic permeability of 5 or less. These materials may include $Ni_{35}Fe_{65}$, $Mn_xNi_yFe_3O_4$, or Gd, depending on factors such as annealing conditions, temperature, and the value of the x and y variables.

Alternatively, the structure of FIG. 15 could be used to control the effective permeability of the layered structure through RKKY or anti-ferromagnetic coupling. For example, layers 266, 268, 270, 272, 274, and 276 (or a greater or lesser number of layers) could be alternating layers of magnetic and nonmagnetic materials. The magnetic materials may include CoFe, Co, Fe, NiFe, or other suitable alternative. The examples of nonmagnetic materials may include Ru, Cr, Cu, Au, (e.g. 6 A° for Ru, 9 A° for Cr, or 10 A° for Cu) and other suitable alternatives. By making the magnetic layers thin, it is possible to drive the effective permeability down to nearly zero. The layers may get thinner as one moves toward the opposite write pole.

As a further alternative, the structure of FIG. 15 could be used to again control the effective permeability of the layered structure. This could be done by sputtering (or applying in some other suitable manner) one or more layers of true antiferromagnetic material, such as iridium manganese (IrMn), ferrous manganese (FeMn), or other antiferromagnetic material, on the P1 edge. This one or more layers would replace layers 266, 268, 270, 272, 274, and 276 that are shown in FIG. 15. The effect of this layer is to provide a variable permeability (permeability will be very small in the vicinity of P1 edge) that would lead to a smoothing of the edge effect and reduction of the ATE field. Note that this is different from the synthetic antiferromagnetic structure described in the previous paragraph. For a synthetic structure, every other layer in the structure is ferromagnetic and can have large permeability at the top edge, depending on the thickness, which could lead to an undesirable ATE field.

Each disclosed technique for reducing ATE may be combined with one or more of the other disclosed techniques for reducing ATE or with any known technique for reducing ATE.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A write transducer, comprising:
  a first write pole (P1) and a second write pole (P2), the second write pole having a pole tip with a side for facing a recording medium, a side facing toward the first write pole, a side facing in an opposite direction from the first write pole, and a pair of lateral sides disposed between the sides facing toward and in an opposite direction from the first write pole, wherein the pair of lateral sides each have a plurality of corresponding faces, including a first face for arranging nearest the recording medium on each lateral side, with the pair of corresponding first faces being generally parallel to each other, the lateral sides each having a second face adjacent to the first face, each of the second faces varying from a parallel position with the first face of the same lateral side by more than 5 degrees and less than 15 degrees, the lateral sides each having a third face adjacent to the second face, each of the third faces varying from a parallel position with the first face of the same lateral side by more than 15 degrees and less than 30 degrees.

2. A write transducer as defined in claim 1, wherein each lateral side further includes a fourth face adjacent to the third face, each of the fourth faces varying from a parallel position with the first face of the same lateral side by more than 30 degrees and less than 60 degrees.

3. A write transducer as defined in claim 1, wherein the angle between the first and second faces is approximately 7 degrees.

4. A write transducer as defined in claim 3, wherein the angle between the first and third faces is approximately 20 degrees.

5. A write transducer as defined in claim 4, wherein the angle between the first and fourth faces is approximately 45 degrees.

6. A write transducer as defined in claim 1, wherein the angle between the first and third faces is approximately 20 degrees.

7. A write transducer as defined in claim 1,
  the first write pole having a main body with a generally planar ABS surface, the main body having a tooth extending out therefrom toward the second write pole, the tooth having a side that is along the ABS surface, the main body having a side that is normal to the ABS surface and generally faces in the direction of the second write pole, the main body having a pair of side faces disposed on opposite sides of the tooth, the faces being recessed from the write pole relative to the tooth, the main body further having an extended notch defined therein between each of the side faces and the ABS surface.

8. A write transducer as defined in claim 7, wherein the notch between the side faces and the ABS surface has a width dimension in a direction normal to the ABS surface and a depth dimension in a direction parallel to the ABS surface, wherein the depth is greater than the width.

9. A write transducer as defined in claim 7, wherein each notch extends for the entire extent of a region where each side face would otherwise intersect with the ABS surface.

10. A write transducer as defined in claim 7, wherein the main body further includes a back notch defined therein in a region between the two side faces and adjacent to the tooth.

11. A write transducer as defined in claim 10, wherein the back notch has a length along a dimension between the two side faces that is approximately equal to the length of the tooth along the same dimension.

12. A write transducer as defined in claim 1,
  said first write pole having a face on a pole tip thereof that is opposed to the side of the pole tip of the second write pole that is facing toward the first write pole, the first write pole having a main body that, along with the opposed face, is composed of a material having a characteristic of a given level of saturation magnetization, the main body also having a region adjacent to the opposed face and that generally faces in the direction of the second write pole, the region having an uppermost layer that is composed of a material having a characteristic of a given level of saturation magnetization that is significantly less than the given level for the main body and opposed face.

13. A write transducer as defined in claim 12, wherein the difference between the two given levels is approximately a factor of 2.

14. A write transducer as defined in claim 12, wherein the region includes more than one layer of material stacked on top of each other, with the given level of saturation magnetization decreasing for each successive layer when proceeding in a direction from the main body to the uppermost layer.

15. A write transducer as defined in claim 12, wherein the second write pole has a back face on the side of the pole tip of the second write pole that is facing in the opposite direction from the first write pole, the back face having an uppermost layer that is composed of the same material as the uppermost layer of the first write pole.

16. A write transducer as defined in claim 15, wherein a remainder of the pole tip of the second write pole is composed of the same material as the main body and opposed face of the first write pole.

17. A write transducer as defined in claim 1,
said first write pole having a face on a pole tip thereof that is opposed to the side of the pole tip of the second write pole that is facing toward the first write pole, the first write pole having a main body that, along with the opposed face, is composed of a magnetic material, the main body also having a region adjacent to the opposed face and that generally faces in the direction of the second write pole, the region having a series of alternating layers that are composed of magnetic and non-magnetic material.

18. A write transducer as defined in claim 17, wherein the layers of magnetic material are composed of the same material as the main body.

19. A write transducer as defined in claim 17, wherein the alternating layers are of uniform thickness.

20. A write transducer as defined in claim 1,
said first write pole having a face on a pole tip thereof that is opposed to the side of the pole tip of the second write pole that is facing toward the first write pole, the first write pole having a main body that, along with the opposed face, is composed of a material having a characteristic of a given level of relative magnetic permeability, the main body also having a region adjacent to the opposed face and that generally faces in the direction of the second write pole, the region having an uppermost layer that is composed of a material having a characteristic of a given level of relative magnetic permeability that is less than 5.

21. A write transducer as defined in claim 20, wherein the uppermost layer has lower magnetic permeability by providing alternating layers of magnetic and non-magnetic material that are antiferromagnetically coupled together.

22. A write transducer as defined in claim 20, wherein the uppermost layer has lower magnetic permeability by utilizing one or more layers of antiferromagnetic material.

23. A read/write head comprising a write transducer having a first write pole (P1) and a second write pole (P2), the second write pole having a pole tip with an air bearing surface (ABS) side, a side facing toward the first write pole, a side facing in an opposite direction from the first write pole, and a pair of lateral sides disposed between the sides facing toward and in an opposite direction from the first write pole, wherein the pair of lateral sides each have a plurality of corresponding faces, including a first face, with the first face of each lateral side being generally parallel to the first face of the other lateral side, the lateral sides each having a second face adjacent to the first face, each of the second faces varying from one of the parallel first faces by a first angle;
wherein the first angle comprises more than 5 degrees and less than 15 degrees;
said read/write head further comprising a third face on each of the lateral sides, the third face on each lateral side being arranged adjacent to the second face on the same lateral side, each third face varying from the parallel first faces by a second angle that is larger than the first angle;
wherein the second angle comprises more than 15 degrees and less than 30 degrees.

24. A read/write head comprising a write transducer having a first write pole (P1) and a second write pole (P2), the second write pole having a pole tip with an air bearing surface (ABS) side, a side facing toward the first write pole, a side facing in an opposite direction from the first write pole, and a pair of lateral sides disposed between the sides facing toward and in an opposite direction from the first write pole, wherein the pair of lateral sides each have a plurality of corresponding faces, including a first face, with the first face of each lateral side being generally parallel to the first face of the other lateral side, the lateral sides each having a second face adjacent to the first face, each of the second faces varying from one of the parallel first faces by a first angle;
wherein the first angle comprises more than 5 degrees and less than 15 degrees;
said read/write head further comprising a third face on each of the lateral sides, the third face on each lateral side being arranged adjacent to the second face on the same lateral side, each third face varying from the parallel first faces by a second angle that is larger than the first angle;
wherein each lateral side further includes a fourth face adjacent to each third face, each of the fourth faces varying from the parallel first face of the same lateral side by a third angle that is greater than the second angle.

25. A read/write head as defined in claim 24, wherein the third angle comprises more than 30 degrees and less than 60 degrees.

* * * * *